United States Patent
Hao et al.

(10) Patent No.: US 12,015,467 B2
(45) Date of Patent: Jun. 18, 2024

(54) COEFFICIENTS REPORT FOR COMPRESSED CSI FEEDBACK

(71) Applicant: QUALCOMM Incorporated, San Diego, CA (US)

(72) Inventors: Chenxi Hao, Beijing (CN); Liangming Wu, Beijing (CN); Qiaoyu Li, Beijing (CN); Joseph Binamira Soriaga, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 17/299,250

(22) PCT Filed: Dec. 12, 2019

(86) PCT No.: PCT/CN2019/124765
§ 371 (c)(1),
(2) Date: Jun. 2, 2021

(87) PCT Pub. No.: WO2020/119749
PCT Pub. Date: Jun. 18, 2020

(65) Prior Publication Data
US 2022/0029686 A1    Jan. 27, 2022

(30) Foreign Application Priority Data
Dec. 12, 2018  (WO) ................ PCT/CN2018/120515

(51) Int. Cl.
*H04B 7/06*  (2006.01)
(52) U.S. Cl.
CPC ......... *H04B 7/0663* (2013.01); *H04B 7/0617* (2013.01); *H04B 7/0626* (2013.01); *H04B 7/0639* (2013.01)

(58) Field of Classification Search
CPC .. H04B 7/0663; H04B 7/0617; H04B 7/0626; H04B 7/0639
See application file for complete search history.

(56) References Cited

U.S. PATENT DOCUMENTS 10,972,170 B2 *   4/2021   Tosato ................. H04B 7/0469
11,190,257 B2 *  11/2021   Li ........................ H04B 7/0695
(Continued)

FOREIGN PATENT DOCUMENTS

CN       107483091 A      12/2017
CN       108111200 A       6/2018
(Continued)

OTHER PUBLICATIONS

Samsung: "Outcome of Offline Session for CSI Enhancement for MU-MIMO Support", 3GPP TSG RAN WG1 Meeting #95, R1-1814201, Nov. 12, 2018-Nov. 16, 2018, Nov. 16, 2018 (Nov. 16, 2018), 3 Pages, XP051494658, Retrieved from the Internet: URL: http://www.3gpp.org/ftp/tsg%5Fran/WG1%5FRL1/TSGR1%5F95/Docs/R1%2D1814201%2Ezip. The Whole Document, part 2.2.
(Continued)

*Primary Examiner* — Bailor C Hsu
(74) *Attorney, Agent, or Firm* — QUALCOMM Incorporated

(57) ABSTRACT

Certain aspects of the present disclosure provide techniques for a coefficients report for compressed channel state information (CSI) feedback. A method for wireless communication by a user equipment (UE) includes receiving a CSI report configuration configuring the UE for reporting precoding matrix information including, a plurality of selected beams L, a frequency domain compression matrix F for each of the L beams at each of a plurality of taps M in the time domain, and a subset of a plurality of linear combination coefficients associated with the frequency domain compression matrices and beams. The UE determines the coefficients
(Continued)

based on a first evaluation that is, for each beam, an evaluation of the amplitude of the coefficients across the taps, and a second evaluation and a evaluation that is, for each tap, an evaluation of the amplitude of the linear combination coefficients across the beams. The UE reports the first and second evaluations.

30 Claims, 8 Drawing Sheets

(56) References Cited

U.S. PATENT DOCUMENTS

| | | | |
|---|---|---|---|
| 11,515,917 B2 * | 11/2022 | Sergeev | H04B 7/0626 |
| 11,637,732 B2 * | 4/2023 | Rahman | H04B 7/0486 |
| | | | 370/329 |
| 11,871,260 B2 * | 1/2024 | Park | H04L 5/0044 |
| 2018/0145737 A1 * | 5/2018 | Rahman | H04B 7/0479 |
| 2018/0234153 A1 | 8/2018 | Lincoln et al. | |
| 2018/0323846 A1 * | 11/2018 | Tsai | H04B 7/0617 |
| 2018/0323926 A1 | 11/2018 | Cezanne et al. | |
| 2018/0367197 A1 * | 12/2018 | Yang | H04B 7/0479 |
| 2019/0260434 A1 * | 8/2019 | Park | H04B 7/0479 |
| 2021/0391910 A1 * | 12/2021 | Wu | H04B 7/0456 |
| 2022/0166486 A1 * | 5/2022 | Sun | H04B 7/063 |
| 2023/0145057 A1 * | 5/2023 | Zhang | H04L 5/0051 |
| | | | 370/329 |
| 2023/0239029 A1 * | 7/2023 | Rahman | H04B 7/0639 |
| | | | 370/252 |
| 2023/0291441 A1 * | 9/2023 | Muruganathan | H04B 7/0456 |
| 2023/0328770 A1 * | 10/2023 | Lee | H04W 72/542 |

FOREIGN PATENT DOCUMENTS

| | | |
|---|---|---|
| CN | 108270473 A | 7/2018 |
| EP | 2850763 A1 | 3/2015 |
| WO | 2013093171 A1 | 6/2013 |
| WO | 2017190356 A1 | 11/2017 |
| WO | 2018097600 A1 | 5/2018 |
| WO | 2018142204 A1 | 8/2018 |
| WO | 2018174636 A2 | 9/2018 |
| WO | 2020101454 A1 | 5/2020 |
| WO | 2020106981 A1 | 5/2020 |

OTHER PUBLICATIONS

Supplementary European Search Report—EP19897366—Search Authority—The Hague—dated Jul. 28, 2022.
Ericsson: "Summary of Views on CSI Reporting V4", 3GPP TSG-RAN WG1 Meeting #94bis, Chengdu, P.R. China, Oct. 6-12, 2018, R1-1812015, Oct. 12, 2018 (Oct. 12, 2018), pp. 1-35, section 5.2.1.4.2, 5.2.3.
International Search Report and Written Opinion—PCT/CN2018/120515—ISA/EPO—dated Sep. 11, 2019.
International Search Report and Written Opinion—PCT/CN2019/124765—ISA/EPO—dated Mar. 2, 2020.
ZTE: "Feature Lead Summary on CSI Measurement," 3GPP TSG-RAN WG1 Meeting #94bis, R1-1811858, Oct. 12, 2018 (Oct. 12, 2018), 15 pages, the whole document.

* cited by examiner

COEFFICIENTS REPORT FOR COMPRESSED CSI FEEDBACK

CROSS REFERENCE TO RELATED APPLICATIONS

This application is a national stage application under 35 U.S.C. 371 of PCT/CN2019/124765, filed Dec. 12, 2019, which claims priority to International Patent Cooperation Treaty Application No. PCT/CN2018/120515, filed Dec. 12, 2018, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for a coefficient report for compressed channel state information (CSI) feedback.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a channel state information (CSI) report configuration. The CSI report configuration configures the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The method generally includes determining the subset of linear combination coefficients based on a first evaluation and a second evaluation. The first evaluation is, for each beam, an evaluation of the amplitude of the linear combination coefficients across the taps, and the second evaluation is, for each tap, an evaluation of the amplitude of the linear combination coefficients across the beams. The method generally includes reporting the first evaluation and the second evaluation.

Certain aspects provide a method for wireless communication by a base station (BS). The method generally includes receiving a CSI report configuration. The CSI report configuration configures the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The method generally includes receiving a reported first evaluation from the UE. The first evaluation is, for each beam, an evaluation of the amplitude of the linear combination coefficients across the taps. The method generally includes receiving a reported second evaluation from the UE. The second evaluation is, for each tap, an evaluation of the amplitude of the linear combination coefficients across the beams. The method generally includes determining the subset of linear combination coefficients based at least in part on the reported first evaluation and the second evaluation.

Certain aspects provide an apparatus for wireless communication. The apparatus generally includes a receiver configured to receive a CSI report configuration. The CSI report configuration configures the apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes at least one processor coupled with a memory and configured to determine the subset of linear combination coefficients based on a first evaluation and a second evaluation. The first evaluation is, for each beam, an evaluation of the amplitude of the linear combination coefficients across the taps, and the second evaluation is, for each tap, an evaluation of the amplitude of the linear combination coefficients across the beams. The apparatus generally includes a transmitter configured to report the first evaluation and the second evaluation.

Certain aspects provide an apparatus for wireless communication. The apparatus generally includes a transmitter configured to send a CSI report configuration to another apparatus. The CSI report configuration configures the other apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes a receiver configured to receive a reported first evaluation from the UE. The first evaluation is, for each beam, an evaluation of the amplitude of the linear combination coefficients across the taps. The receiver is configured to receive a reported second evaluation from the other apparatus. The second evaluation is, for each tap, an evaluation of the amplitude of the linear combination coefficients across the beams. The apparatus generally includes at least one processor coupled with a memory and configured to determine the subset of linear combination coefficients based at least in part on the reported first evaluation and the second evaluation.

Certain aspects provide an apparatus for wireless communication. The apparatus generally includes means for receiving a CSI report configuration. The CSI report configuration configures the apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes means for determining the subset of linear combination coefficients based on a first evaluation and a second evaluation. The first evaluation is, for each beam, an evaluation of the amplitude of the linear combination coefficients across the taps, and the second evaluation is, for each tap, an evaluation of the amplitude of the linear combination coefficients across the beams. The apparatus generally includes means for reporting the first evaluation and the second evaluation.

Certain aspects provide an apparatus for wireless communication. The apparatus generally includes means for sending a CSI report configuration to another apparatus. The CSI report configuration configures the other apparatus for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The apparatus generally includes means for receiving a reported first evaluation from the other apparatus. The first evaluation is, for each beam, an evaluation of the amplitude of the linear combination coefficients across the taps. The apparatus generally includes means for receiving a reported second evaluation from the other apparatus. The second evaluation is, for each tap, an evaluation of the amplitude of the linear combination coefficients across the beams. The apparatus generally includes means for determining the subset of linear combination coefficients based at least in part on the reported first evaluation and the second evaluation.

Certain aspects provide a computer readable medium storing computer executable code thereon for wireless communication. The computer readable medium generally includes code for receiving a CSI report configuration. The CSI report configuration configures a UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The computer readable medium generally includes code for determining the subset of linear combination coefficients based on a first evaluation and a second evaluation. The first evaluation is, for each beam, an evaluation of the amplitude of the linear combination coefficients across the taps, and the second evaluation is, for each tap, an evaluation of the amplitude of the linear combination coefficients across the beams. The computer readable medium generally includes code for reporting the first evaluation and the second evaluation.

Certain aspects provide a computer readable medium storing computer executable code thereon for wireless communication. The computer readable medium generally includes code for sending a CSI report configuration to a UE. The CSI report configuration configures the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams. The computer readable medium generally includes code for receiving a reported first evaluation from the UE. The first evaluation is, for each beam, an evaluation of the amplitude of the linear combination coefficients across the taps. The computer readable medium generally includes code for receiving a reported second evaluation from the UE. The second evaluation is, for each tap, an evaluation of the amplitude of the linear combination coefficients across the beams. The computer readable medium generally includes code for determining the subset of linear combination coefficients based at least in part on the reported first evaluation and the second evaluation.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
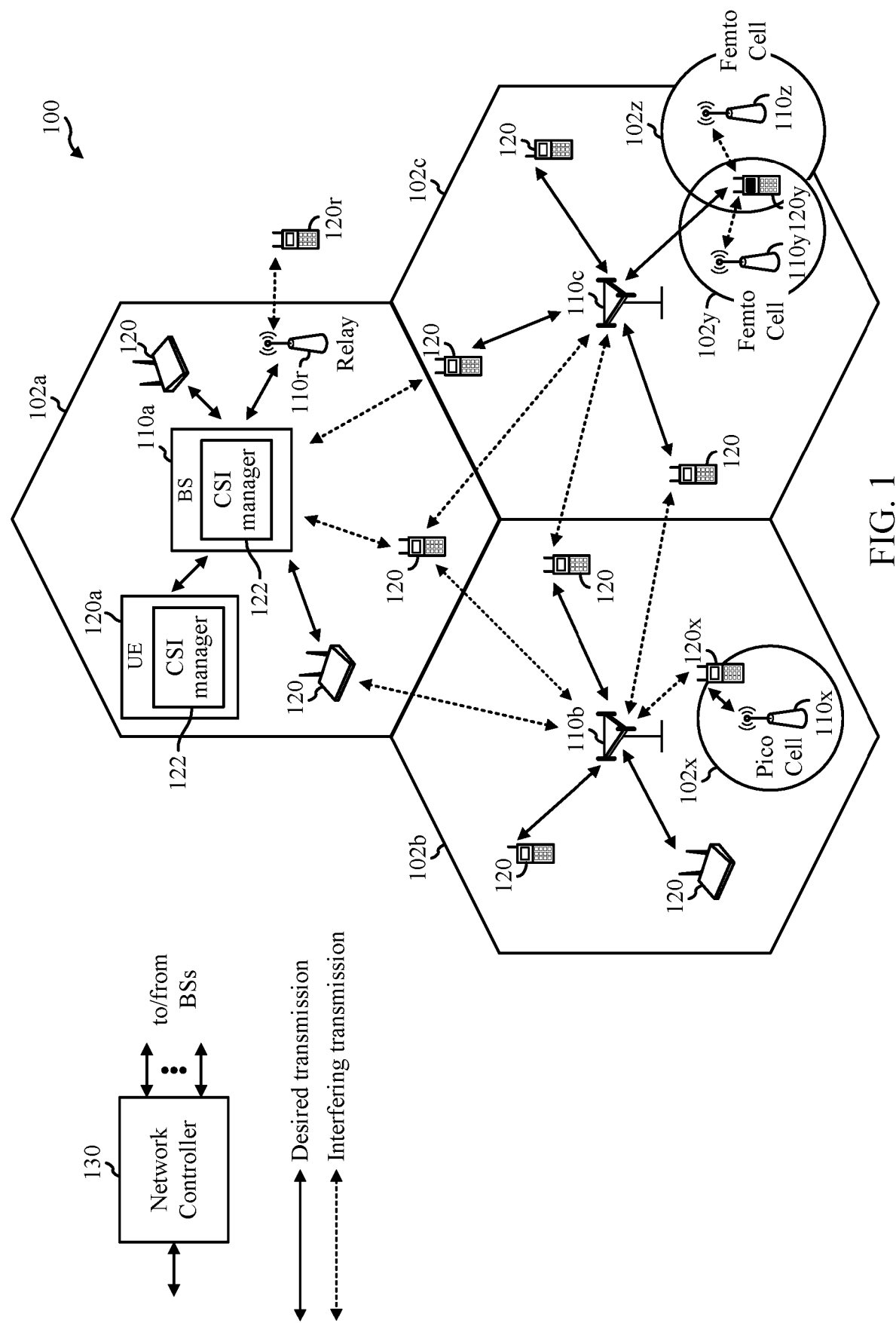
FIG. 1 is a block diagram conceptually illustrating an example telecommunications system, in accordance with certain aspects of the present disclosure.

Aspects of the present disclosure provide apparatus, methods, processing systems, and computer readable mediums for a coefficient reporting for compressed channel state information (CSI) feedback.

In some systems, a user equipment (UE) CSI feedback may be compressed, for example in at least the spatial domain (SD) and the frequency domain (FD). The UE determines linear combination coefficients per beam, polarization, and compression basis. The UE may be configured to report subset of the total linear combination coefficients to report. In some techniques, a bitmap or combination number are used to indicate the subset of linear combination coefficients. The BS can use the linear combination coefficients to obtain the CSI feedback. However, due to the high number of coefficients, the overhead may be large. Therefore, techniques for FD compressed CSI reporting (e.g., using the enhanced linear combination codebook) to efficiently indicate the subset of linear combination are desired.

Accordingly, aspects of the present disclosure provide techniques and apparatus for a coefficient report for compressed CSI feedback using a reduced number of bits. Aspects of the present disclosure provide a 2D amplitude reporting for a joint amplitude and location indication, and reporting quantized phase and differential amplitudes associated with the reported subset of coefficients. Thus, the UE is able to use a smaller number of bits to report the linear combination coefficients, which reduces the overhead.

The following description provides examples of coefficient reporting for compressed CSI feedback, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may support MIMO transmissions with precoding. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Beamforming may be supported and beam direction may be dynamically configured.

FIG. 1 illustrates an example wireless communication network 100 in which aspects of the present disclosure may be performed. The wireless network 100 may be a 5G NR network. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a cell, which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS 110 may support one or multiple cells. A network controller 130 may couple to a set of BSs 110 and provide coordination and control for these BSs 110. The network controller 130 may communicate with the BSs 110 via a backhaul.

The BSs 110 communicate with UEs 120a-y (each also individually referred to herein as UE 120 or collectively as UEs 120). The UEs 120 may be dispersed throughout the wireless communication network 100, and each UE 120 may be stationary or mobile. Wireless communication network 100 may also include relay stations (e.g., relay station 110r), also referred to as relays or the link, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120 to facilitate communication between devices.

According to certain aspects, the BSs 110 and UEs 120 may be configured for CSI feedback. As shown in FIG. 1, the BS 110a includes a CSI manager 112 and the UE 120a includes a CSI manager 122. The CSI manager 112 may be configured to send, and the CSI manager 122 may be configured to receive, a CSI report configuration. The CSI report configuration configures the UE 120a for reporting at least a subset of precoding matrix information including, a plurality of selected beams L, a frequency domain compression matrix F for each of the L beams at each of a plurality of taps M in the time domain, and a subset of a plurality of linear combination coefficients associated with the frequency domain compression matrices and beams. The CSI manager 122 may be configured to determine the subset of linear combination coefficients based on a first evaluation that is, for each beam, an evaluation of the amplitude of the linear combination coefficients across the taps, and a second evaluation that is, for each tap, an evaluation of the amplitude of the linear combination coefficients across the beams. The CSI manager 122 may be configured to report, and the CSI manager 112 may be configured to receive, the first evaluation and the second evaluation. The CSI manager 112 may be configured to determine the subset of linear combination coefficients based at least in part on the reported first evaluation and the second evaluation from the UE 120a.

Figure 2:
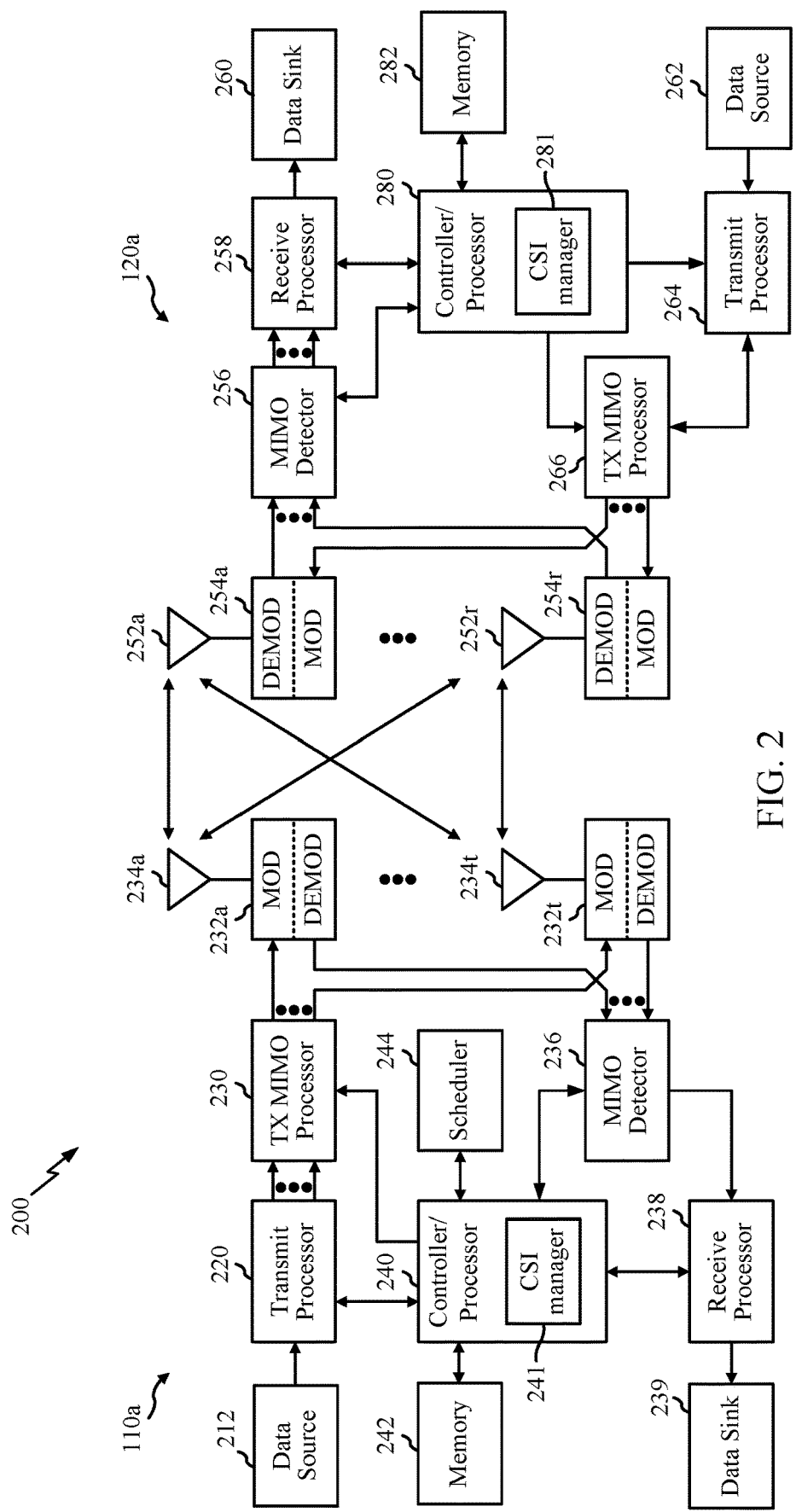
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and CSI reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a through 254r (e.g., for SC-FDM, etc.), and transmitted to the BS 110a. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for coefficient reporting for compressed CSI feedback. The controllers/processors 240 and 280 may direct the operation at the BS 110a and the UE 120a, respectively. The memories 242 and 282 may store data and program codes for BS 110a and UE 120a, respectively. A scheduler 244 may schedule UEs for data transmission on the downlink and/or uplink. As shown in FIG. 2, the controller/processor 240 of the BS 110a has a CSI manager 241 that may be configured for coefficient reporting for compressed CSI, according to aspects described herein. As shown in FIG. 2, the controller/processor 280 of the UE 120a has a CSI manager manager 241 that may be configured for coefficient reporting for compressed CSI, according to aspects described herein. Although shown at the controller/processor, other components of the UE 120a and BS 110a may be used to perform the operations described herein.

NR may utilize orthogonal frequency division multiplexing (OFDM) with cyclic prefix (CP) on the uplink and/or downlink and may use single-carrier frequency division multiplexing (SC-FDM) on the uplink. NR may support half-duplex operation using time division duplexing (TDD). OFDM and SC-FDM partition the system bandwidth into multiple orthogonal subcarriers, which may be referred to as tones, bins, etc. Each subcarrier may be modulated with data. Modulation symbols may be sent in the frequency domain with OFDM and in the time domain with SC-FDM. In NR, the minimum resource allocation (e.g., a resource block (RB)) may be 12 consecutive subcarriers. The system bandwidth may also be partitioned into subbands, which may cover multiple RBs. The spacing between adjacent subcarriers may be fixed, and the total number of subcarriers may be dependent on the system bandwidth. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
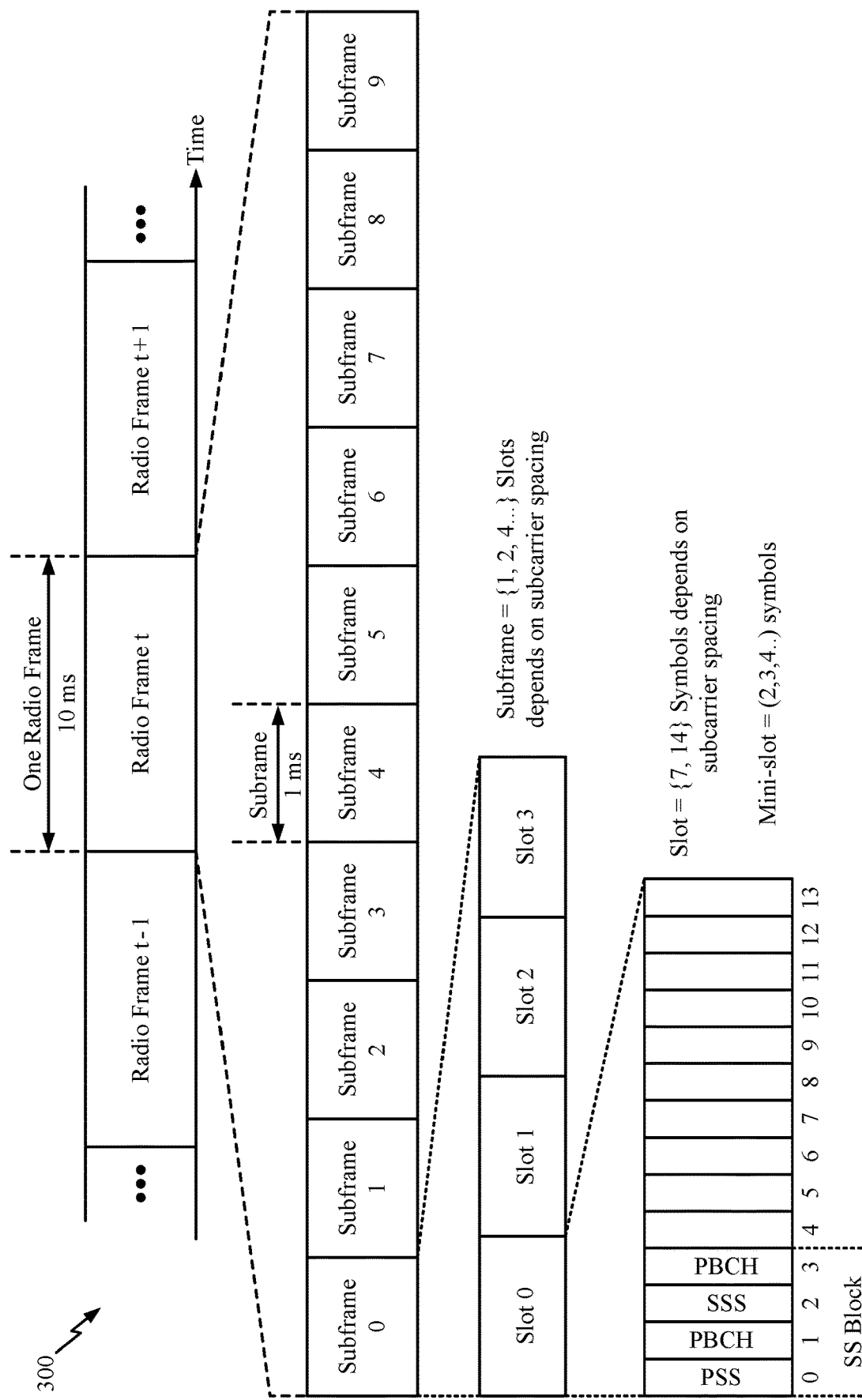
FIG. 3 illustrates an example of a frame format for a new radio (NR) system, in accordance with certain aspects of the present disclosure.

In NR, a subframe is 1 ms, but the basic TTI is referred to as a slot. A subframe contains a variable number of slots (e.g., 1, 2, 4, 8, 16, . . . slots) depending on the SCS. FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

As discussed above, aspects of the disclosure are related to coefficient reporting for compressed CSI.

CSI may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI may be estimated at the receiver (e.g., a UE), quantized, and fed back to the transmitter (e.g., a BS).

The network (e.g., a BS), may configure UEs for CSI reporting. For example, the BS may configure the UE with a CSI report configuration or with multiple CSI report configurations. The CSI report configuration may be provided to the UE via higher layer signaling, such as radio resource control (RRC) signaling. The CSI report configuration may be associated with CSI-RS resources for channel measurement (CM), interference measurement (IM), or both. The CSI-RS resources may provide the UE with the configuration of CSI-RS ports, or CSI-RS port groups, mapped to time and frequency resources (e.g., resource elements (REs)). CSI-RS resources can be zero power (ZP) and/or non-zero power (NZP) resources. At least one NZP CSI-RS resource may be configured for CM.

The CSI report configuration also configures the CSI parameters (sometimes referred to as quantities) to be reported by the UE. Three codebooks include Type I single panel, Type I multi-panel, and Type II single panel. Regardless which codebook is used, the CSI report may include a channel quality indicator (CQI), a precoding matrix indicator (PMI), a CSI-RS resource indicator (CRI), and/or a rank indicator (RI). The structure of the PMI may vary based on the codebook. The CRI, RI, and CQI may be in a first part (Part I) and the PMI may be in a second part (Part II) of the CSI report. For the Type I single panel codebook, the PMI may consist of a W1 matrix (e.g., subset of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI reported on the physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state. The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

As discussed above, in certain systems (e.g., Release-15 NR systems), the UE is configured to report precoder matrix information (e.g., for the Type II CSI codebook) across subbands using a linear combination codebook. The CSI feedback may be compressed in the spatial domain. In the linear combination codebook, the precoder of each layer is formed by a linear combination of a set of spatial beams. The linear combination coefficients are reported on the subband level and, therefore, the overhead scales with the number of subbands. For example, the UE can be configured to report the precoder $$w_r = \sum_{l=0}^{L-1} \binom{b_l \cdot c_{1,l}}{b_l \cdot c_{2,l}},$$

where b is the selected beam, $c_{1,l}=[c_{1,l,0} \ldots c_{1,l,N_{SB}-1}]$ is the set of linear combination coefficients for a first polarization (e.g., +45) and $c_{2,l}=[c_{2,l,0} \ldots c_{2,l,N_{SB}-1}]$ is the set of linear combination coefficients for a second polarization (e.g., −45), L is the number of selected spatial beams, and $N_{SB}$ is the number of subbands configured for CSI reporting.

In certain systems (e.g., Release-16 NR systems), an enhanced linear combination codebook may be used, for example, for type II CSI reporting. The enhanced linear combination codebook may configure compressed CSI feedback reporting. The number of linear combination coefficients can be compressed in the frequency domain (e.g., in addition to the spatial domain). In some examples, the linear combination coefficients can be compressed in the frequency domain via a discrete Fourier transform (DFT)-based matrix. The coefficients are formed by a multiplication of a set of frequency domain compression basis and a coefficient matrix in the compressed domain. Then, among the coefficients in the compressed domain, the UE may choose to report a subset of the coefficients based on their amplitudes. In this case, UE has to report to the location of the subset of coefficients. Then, the UE reports the selected basis and coefficients to the BS after the compression. The BS can apply the coefficients to the selected basis to obtain the CSI feedback.

In some examples, the UE may be configured to report the precoder $$w_r = \sum_{l=0}^{L-1} \begin{pmatrix} b_l \cdot c_{1,l} \cdot F_{1,l}^H \\ b_l \cdot c_{2,l} \cdot F_{2,l}^H \end{pmatrix},$$

where $F_{1,l}^H = [f_{1,l,0} \ldots f_{1,l,m_{1,l}-1}]^H$ is the FD compression matrix (e.g., a DFT-basis of size $M_{1,l} \times N_3$) for the first polarization and $F_{2,l}^H = [f_{2,l,0} \ldots f_{2,l,M_{2,l}-1}]^H$ is the FD compression matrix (e.g., a DFT-basis of size $M_{2,l} \times N_3$) for the second polarization, $c_{1,l} = [c_{1,l,0} \ldots c_{1,l,M_{1,l}-1}]$ are the coefficients for the first and the second polarization, respectively, $N_3$ is the frequency dimension of the precoder $w_r$, and $M_{1,l}$ and $M_{2,l}$ are dimension of the compressed domain for the first and second polarization, respectively. For example, $M_{1,l} \leq N_3$ and $M_{2,l} \leq N_3$. $M_{1,l}$ and $M_{2,l}$ may be the same or different.

The beam index and polarization index can be merged as $w_r = \sum_{i=0}^{2L-1} b_i c_i F_i^H$, where $c_i = [c_{i,0} \ldots c_{i,M_i-1}]$, $F_i^H = [f_{i,0} \ldots f_{i,M_i-1}]^H$ of size $M_i \times N_3$, and $$b_i = \begin{bmatrix} b_l \\ 0 \end{bmatrix} \text{ if } i \leq L-1 \text{ and } b_i = \begin{bmatrix} 0 \\ b_l \end{bmatrix} \text{ if } i > L-1 \text{ and } l = i - L.$$

In this case, the UE may be configured to report the spatial beam selection $b_0 \ldots b_{L-1}$, the FD compression basis selection $F_i^H = [f_{i,0} \ldots f_{i,M_i-1}]^H$, and the coefficients $c_i$. In some examples, the UE only reports the FD compression basis common for all i (spatial beams), i.e., $F_i = F$ and $M_i = M$, $\forall i = 0, 1, \ldots, 2L-1$. In some examples, the UE reports only a subset of coefficients $K_0 < K$ total coefficients, where $K = \sum_{i=0}^{2L-1} M_i$ if $F_i$ is beam-specific, or $K = 2LM$ coefficients if $F_i$ is beam-common.

Figure 4:
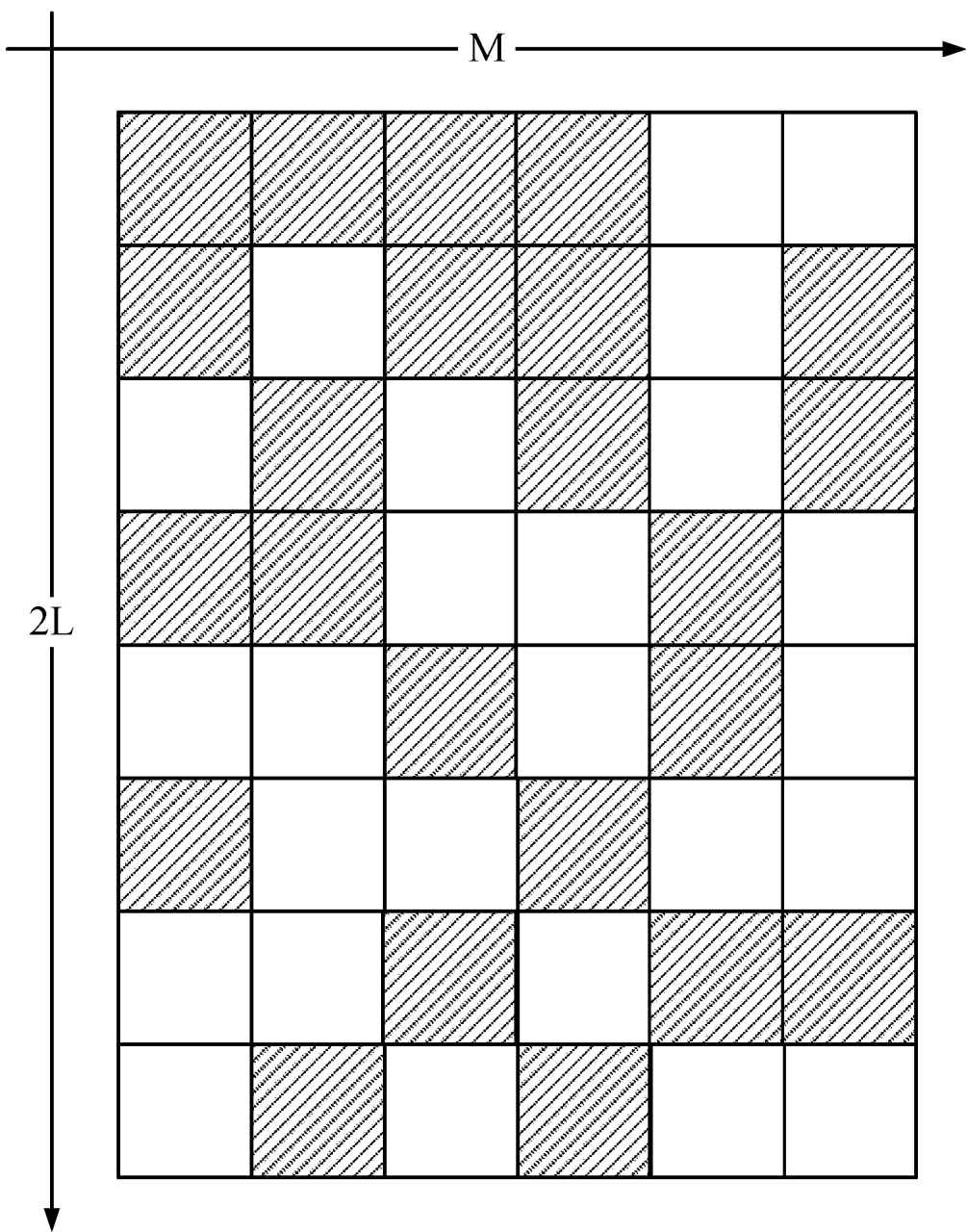
FIG. 4 is a table showing an example subset of linear combination coefficient for reporting, in accordance with certain aspects of the present disclosure.

FIG. 4 is an example grid of 2L×M coefficients. In some examples, to determine the $K_0$-size subset of linear combination coefficients to report, the UE reports the $K_0$ most significant coefficients among the 2LM coefficients. The $K_0$ most significant coefficients may be anywhere on the grid. In some examples, the UE may report the $K_0$-size subset of linear combination coefficients via a bitmap (e.g., a 2LM size bitmap). In the example shown in FIG. 4, L=4, M=6, and there are 2 polarization, giving 48 bits used to indicate the subset and 144 bits for amplitude and phase quantization (if $K_0$=24 coefficients are selected to be reported, and 3-bit amplitude quantization and 3-bit phase quantization are employed). In some examples, the UE may report the $K_0$-size subset of linear combination coefficients via a combination number, for example using $$\left\lceil \log_2 \binom{2LM}{K_0} \right\rceil$$

bits in total. In the example shown in FIG. 4, the UE uses 45 bits to indicate the subset and 144 bits for amplitude and phase quantization.

Thus, the overhead for coefficient reporting for compresses CSI may be significant. Therefore, techniques for FD compressed CSI reporting (e.g., using the enhanced linear combination codebook) to efficiently indicate the subset of linear combination coefficients are desired.

Example Basis Report for Compressed CSI Feedback with Non-Contiguous Subband Configuration Aspects of the present disclosure provide techniques and apparatus for a coefficient report for compressed channel state information (CSI) feedback. In some examples, a user equipment (UE) can use 2D amplitude reporting for a joint amplitude and location indication to a base station (BS). For example, one amplitude reporting is associated with a first evaluation (e.g., an average, sum, or max) of the amplitude that evaluated per row of the coefficient matrix (e.g., per spatial beam) and another amplitude reporting is associated with a second evaluation (e.g., average, sum, or max) of the amplitude per column of the coefficient matrix (e.g., per frequency domain (FD) compression basis). Based on the evaluations, the UE and BS can sort the coefficients and identify a number of strong coefficients. The UE reports quantized phase and differential amplitudes associated with the coefficients. Thus, the UE is able to use a small number of bits to report the coefficients, which saves the overhead.

Figure 5:
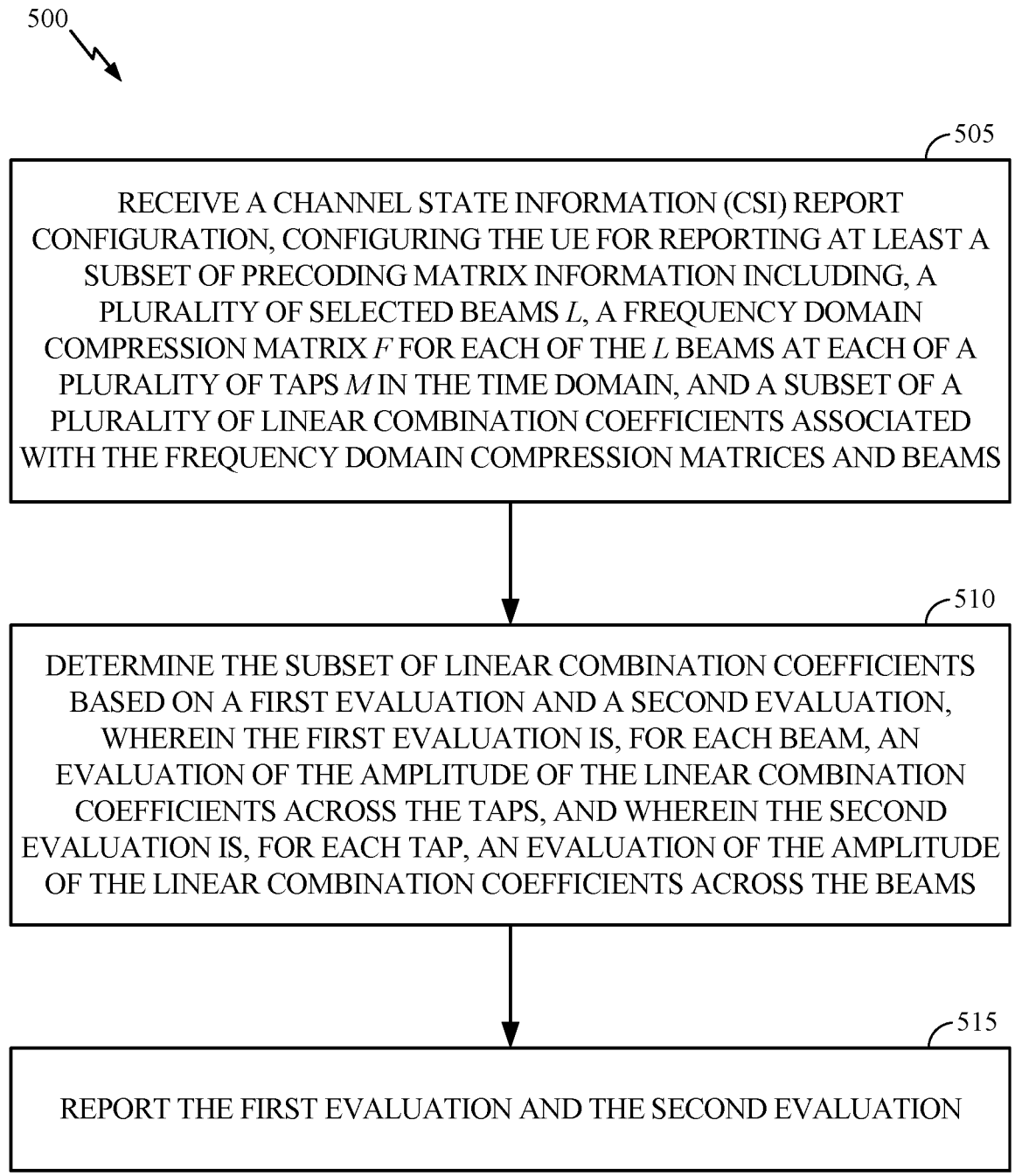
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as the UE 120a in the wireless communication network 100). Operations 500 may be implemented as software components that are executed and run on one or more processors (e.g., processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 500 may begin, at 505, by receiving (e.g., from a BS) a CSI report configuration, configuring the UE for reporting at least a subset of precoding matrix information. The subset of precoding matrix information includes a plurality of selected beams (e.g., L beams), a FD compression matrix (F) for each of the beams at each of a plurality of taps (e.g., M taps or FD basis) in the time domain, and a subset of a plurality of linear combination coefficients associated with the FD compression matrices and beams.

The UE may select and report the L beams from a fixed set of candidate beams, where the number of the L beams and the total number of the set of candidate beams are configured by the BS. For each beam, the UE may select and report the compression matrix from a set of candidate compression basis, where the compression matrix is the same or different across different beams, and the number of basis involved in each compression matrix is configured by the BS or selected and reported by the UE.

At 510, the UE determines the subset of linear combination coefficients based on a first evaluation and a second evaluation. The first evaluation is, for each beam, an evaluation of the amplitude of the linear combination coefficients across the taps. If the FD compression basis is DFT-based, then a FD compression base may correspond to a tap in time domain). The second evaluation is, for each tap, an evaluation of the amplitude of the linear combination coefficients across the beams.

The UE may determine the plurality of linear combination coefficients. For example, as shown in FIG. 4, the UE may determine the linear combination coefficients in the 2L rows corresponding to the L beams, each beam associated with two polarizations, and the linear combination coefficients in the M columns corresponding to the M taps. For the first evaluations, the UE may report the average, sum, or max amplitude per row of the matrix. Thus, for each of the 2L spatial beam, the UE evaluates the average, sum, or max amplitude of the coefficients across the M taps or FD basis. In some examples, the UE reports each of the amplitude evaluations via a 3-bit quantization for each of the 2 L average amplitude (e.g., $[1, \sqrt[4]{1/2}, \sqrt[4]{1/4}, \sqrt[4]{1/8}, \sqrt[4]{1/16}, \sqrt[4]{1/32}, \sqrt[4]{1/64}, 0]$), denoted by $a=(a_0, a_1, \ldots, a_{2L-1})$. For the second evaluations, the UE may report the average, sum, or max amplitude per column of the matrix. Thus, for each of the M taps or FD basis, the UE evaluates the average, sum, or max amplitude across the 2L beams. In some examples, the UE reports each of the amplitude evaluations via a 3-bit quantization for each of the M average amplitude (e.g., $[1, \sqrt[4]{1/2}, \sqrt[4]{1/4}, \sqrt[4]{1/8}, \sqrt[4]{1/16}, \sqrt[4]{1/32}, \sqrt[4]{1/64}, 0]$) denoted by $b=(b_0, b_1, \ldots, b_{M-1})$. The quantization used for the first evaluations and second evaluation can be the same or different.

The UE may determine, for a linear combination coefficient associated with a beam and a tap, a third evaluation of its amplitude based at least in part on the first evaluation associated with the beam, and the second evaluation associated with the tap. The UE can then order the plurality of linear combination coefficients based on the corresponding third evaluations. For example, the UE can sort the 2L×M coefficients based on the evaluations $(a_0, a_1, \ldots, a_{2L-1})$ and the second evaluations $(b_0, b_1, \ldots, b_{M-1})$. For the (i,m)-entry, the UE computes $x_{i,m}$ using $a_i$ and $b_m$, for example as $x_{i,m}=a_i+b_m$ or $x_{i,m}=a_i \times b_m$, and then the UE sorts the coefficients based on $x_{i,m}$. The UE reports the subset of the plurality of linear combination coefficients based on the ordering. For example, the UE may select the $K_0$ most significant coefficients based on $x_{i,m}$. In the example shown in FIG. 4, using the 2D reporting, 42 bits may be used to report the coefficients (e.g., L=4, M=6, (2L+M)*3=42 bits).

In some cases, multiple linear combination coefficients may have an equal third evaluation (e.g., have the same value of $x_{i,m}$). In this case, the UE may order the at least two linear combination coefficients based on the coefficient having a higher first evaluation (e.g., with the higher average amplitude per row). For example, the UE may rank $x_{i_1,m_1}$ higher than $x_{i_2,m_2}$ if $a_{i_1}>a_{i_2}$; otherwise, the UE ranks $x_{i_2,m_2}$ higher than $x_{i_1,m_1}$. In some examples, the UE orders the at least two linear combination coefficients based on the coefficient having a higher second evaluation (e.g., with the higher average amplitude per column). For example, the UE may rank higher than $x_{i_1,m_1}$ if $b_{m_1}>b_{m_2}$; otherwise, the UE ranks $x_{i_2,m_2}$ higher than $x_{i_1,m_1}$. In some examples, the UE orders the at least two linear combination coefficients based on the coefficient having a max of a first evaluation and a second evaluation higher than the max of a first evaluation and a second evaluation of the other coefficient. For example, the UE may rank $x_{i_1,m_1}$ higher than $x_{i_2,m_2}$ if $\max(a_{i_1}, b_{m_1})>\max(a_{i_2},b_{m_2})$; otherwise, the UE ranks $x_{i_2,m_2}$ higher than $x_{i_1,m_1}$.

At 515, the UE reports the first evaluation and the second evaluation (e.g., to the BS). In some examples, the number of reported linear combination coefficients K is configured by the BS, determined based on a threshold value of the third evaluation, and/or determined by the UE and reported in the CSI report.

According to certain aspects, the UE reports the quantized coefficients $\alpha_{i,m} e^{-j2\pi\phi}$.

According to certain aspects, the amplitude of the coefficients is based on a differential value and the first evaluation and/or the second evaluation. The UE may report the differential amplitude for each of the reported coefficients. In some examples, the differential amplitude of each of the reported coefficients is via a quantization of the same resolution (e.g., 1 or 2 bits). In some examples, the differential amplitude of a first set of the coefficients (e.g., the $K'_0$ most significant coefficients) are reported via a quantization of a first resolution (e.g., 2 bits) and the differential amplitude of a second set of the coefficients (e.g., the remaining coefficients) are reported via a quantization of a lower second resolution (e.g. 1 bit). For example, the differential amplitude value can be reported as $$\delta_{i,m} \in \left\{1, \sqrt{\frac{1}{2}}\right\} \text{ or } \delta_{i,m} \in \left\{1, \sqrt{\frac{3}{4}}, \sqrt{\frac{2}{3}}, \sqrt{\frac{1}{2}}\right\}.$$

If the (i,m)-entry is reported, its final amplitude may be based on and at least one of $a_i$ and $b_m$ $$\left(\text{e.g., } \alpha_{i,m} = a_i \times \delta_{i,m}, \alpha_{i,m} = b_m \times \delta_{i,m} \text{ or } \alpha_{i,m} = \frac{a_i + b_m}{2} \times \delta_{i,m}, \text{ or}\right.$$
$$\left.\alpha_{i,m} = a_i \times b_m \times \delta_{i,m}\right).$$

According to certain aspects, the UE reports phases for the reported coefficients via a quantization. In some examples, the phases of each of the reported coefficients is via a quantization of the same resolution (e.g., 1 or 2 bits). In some examples, the phase of a first set of the coefficients (e.g., the $K'_0$ most significant coefficients) are reported via a quantization of a first resolution (e.g., 3 bits) and the phase of a second set of the coefficients (e.g., the remaining coefficients) are reported via a quantization of a lower second resolution (e.g., 2 bits). For example, the phases can be reported as $$QPSK \ \phi \in \left\{0, \frac{\pi}{2}, \pi, \frac{3\pi}{2}\right\} \text{ or } 8PSK \ \phi \in \left\{0, \frac{\pi}{4}, \frac{\pi}{2}, \frac{3\pi}{4}, \pi, \frac{5\pi}{4}, \frac{3\pi}{2}, \frac{7\pi}{4}\right\}.$$

In some examples, the amplitude quantization and/or the phase quantization is configured via higher layer signaling, or determined by the UE and reported to the BS. If the UE determines/reports $K_0$, it is indicated via $\lceil \log_2 K \rceil$ bits, and encoded in the first part of CSI report together with RI and CQI. In some examples, $K'_0$ may be configured via higher layer signaling, dependent on $K_0$, or determined by the number of coefficients with a third evaluation that is greater than a threshold.

The techniques described above may result in less overhead for the compressed CSI feedback reporting. For the example of FIG. 4, 42 bits may be used to report the 2D amplitude+3 bits phase per reported coefficient (24*3)= 114+1 and/or 2 bit(s) differential amplitude per reported coefficient (e.g., 24 or 48 bits) for a total of 138 bits or 162 bits, respectively, which is fewer than the 189 bits for reporting via a combination number and the 192 bits for reporting via a bitmap.

Figure 6:
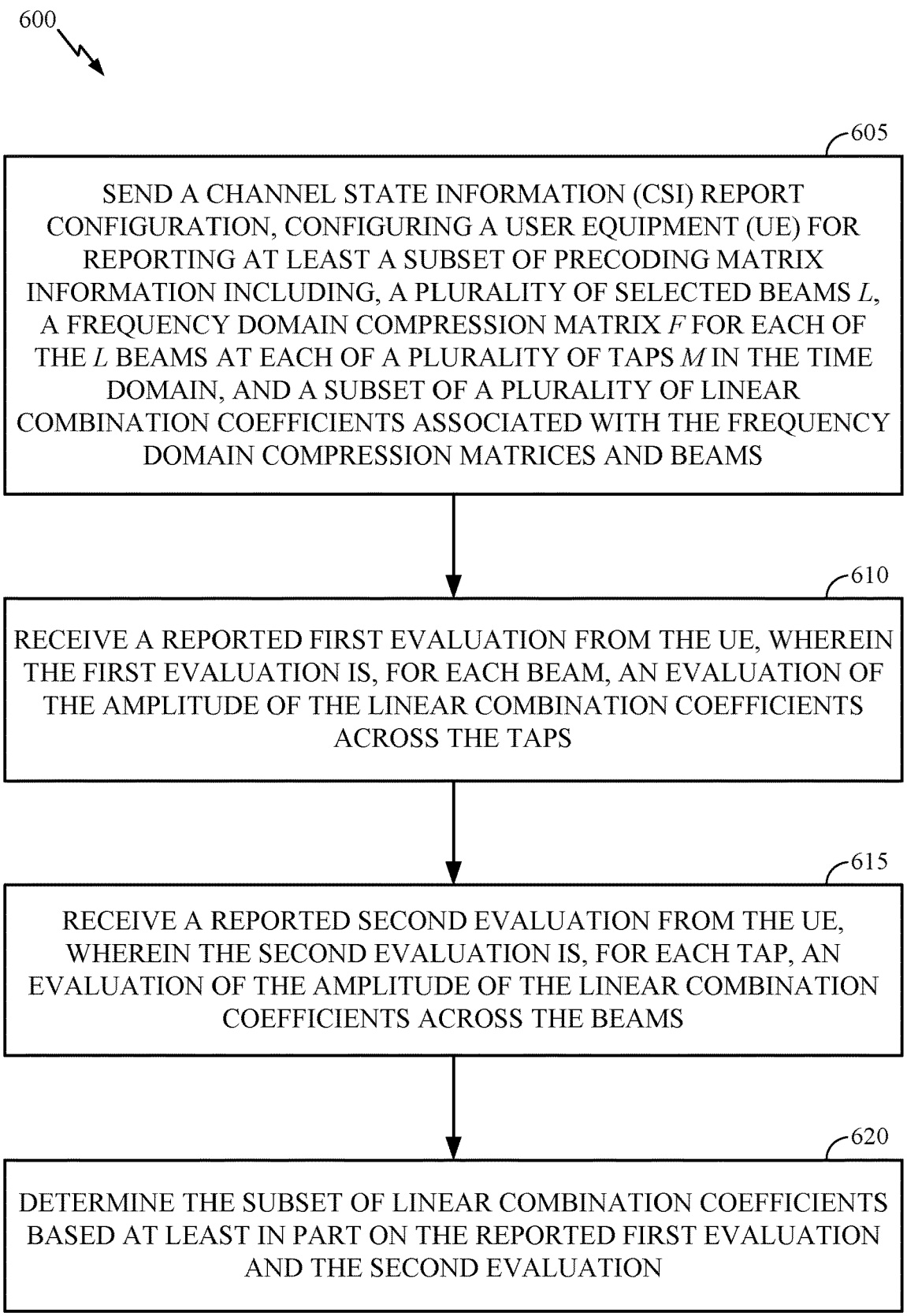
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110a in the wireless communication network 100). The operations 600 may be complementary operations by the BS to the operations 500 performed by the UE. Operations 600 may be implemented as software components that are executed and run on one or more processors (e.g., processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 600 may begin, at 605, by sending a CSI report configuration, configuring a UE for reporting at least a subset of precoding matrix information. The precoding matrix information includes a plurality of selected beams (e.g., L beams), a FD compression matrix (F) for each of the beams at each of a plurality of taps (e.g., M taps or FD basis) in the time domain, and a subset of a plurality of linear combination coefficients associated with the FD compression matrices and beams.

At 610, the BS receives a reported first evaluation from the UE. The first evaluation is, for each beam, an evaluation of the amplitude of the linear combination coefficients across the taps.

At 615, the BS receives a reported second evaluation from the UE. The second evaluation is, for each tap, an evaluation of the amplitude of the linear combination coefficients across the beams.

At 620, the BS determines the subset of linear combination coefficients based at least in part on the reported first evaluation and the second evaluation.

According to certain aspects, the BS receives the reported plurality of selected beams, the FD compression matrix for each of the beams, and the subset of linear combination coefficients. The BS can apply the subset of linear combination coefficients to the FD compression matrix to obtain the precoding matrix information for the beams. The BS may determine, for a linear combination coefficient associated with a beam and a tap, a third evaluation of its amplitude based at least in part on the first evaluation associated with the beam, and the second evaluation associated with the tap. The BS may order the plurality of linear combination coefficients based on the corresponding third evaluations and determine the subset of the plurality of coefficients based at least in part on the ordering. The BS may also receive quantized differential amplitudes and phases associated with the reported coefficients.

Figure 7:
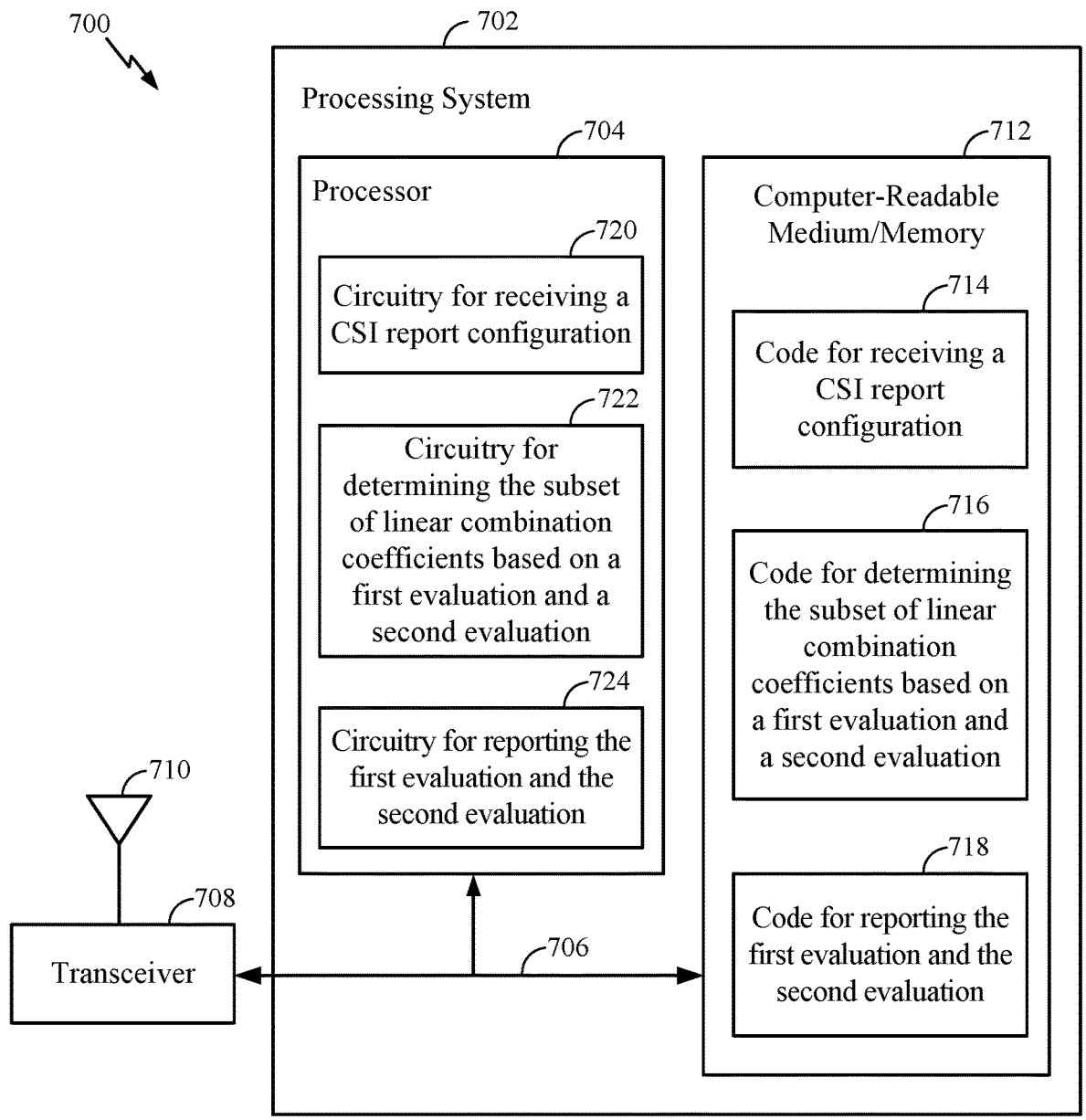
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for coefficient reporting for enhanced linear combination codebook. In certain aspects, computer-readable medium/memory 712 stores code 714 for receiving a CSI report configuration; code 716 for determining the subset of linear combination coefficients based on a first evaluation and a second evaluation; and code 718 for reporting the first and second evaluation, in accordance with aspects of the present disclosure. In certain aspects, the processor 704 has circuitry configured to implement the code stored in the computer-readable medium/memory 712. The processor 704 includes circuitry 720 for receiving a CSI report configuration; circuitry 722 for determining the subset of linear combination coefficients based on a first evaluation and a second evaluation; and circuitry 724 for reporting the first and second evaluations, in accordance with aspects of the present disclosure.

Figure 8:
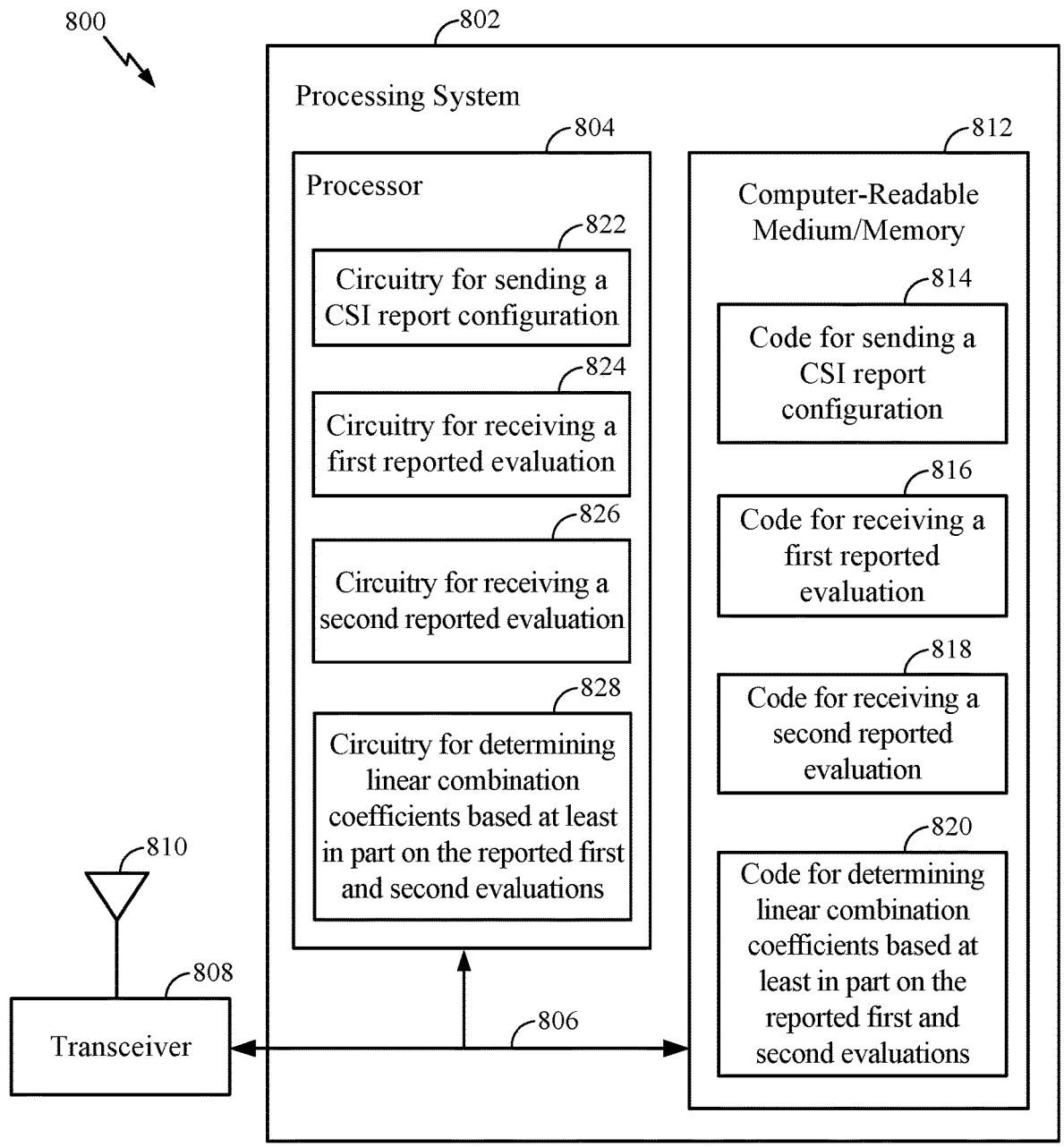
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for coefficient reporting for enhanced linear combination codebook. In certain aspects, computer-readable medium/memory 812 stores code 814 for sending a CSI report configuration; code 816 for receiving a first reported evaluation; code 818 for receiving a reported second evaluation; and code 820 for determining the subset of linear combination coefficients based at least in part on the first and second evaluations, in accordance with aspects of the present disclosure. In certain aspects, the processor 804 has circuitry configured to implement the code stored in the computer-readable medium/ memory 812. The processor 804 includes circuitry 822 for sending a CSI report configuration; circuitry 824 for receiving a first reported evaluation; circuitry 826 for receiving a second reported evaluation; and circuitry 828 for determining the subset of linear combination coefficients based at least in part on the first and second evaluations, in accordance with aspects of the present disclosure.

EXAMPLE ASPECTS

In a first aspect, a method for wireless communication by a user equipment (UE) includes receiving a channel state information (CSI) report configuration, configuring the UE for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams; and determining the subset of linear combination coefficients based on a first evaluation and a second evaluation. The first evaluation is, for each beam, an evaluation of the amplitude of the coefficients across the taps. The second evaluation is, for each tap, an evaluation of the amplitude of the linear combination coefficients across the beams. The UE reports the first evaluation and the second evaluation.

In a second aspect, in combination with the first aspect, determining the subset of linear combination coefficients based on the first evaluation and the second evaluation includes determining, for a linear combination coefficient associated with a beam and a tap, a third evaluation of the amplitude based at least in part on the first evaluation associated with the beam, and the second evaluation associated with the tap; ordering the plurality of linear combination coefficients based on the corresponding third evaluations; and reporting the subset of the plurality of linear combination coefficients based on the ordering.

In a third aspect, alone or in combination with one or more of the first and second aspects, at least two linear combination coefficients have an equal third evaluation, and the ordering includes ordering the at least two linear combination coefficients based on one of: the linear combination coefficient having a higher first evaluation; the linear combination coefficient having a higher second evaluation; or the linear combination coefficient having max of a first evaluation and a second evaluation higher than the max of a first evaluation and a second evaluation of the other linear combination coefficient.

In a fourth aspect, alone or in combination with one or more of the first through third aspects, the location and the amplitude for each of the linear combination coefficients are jointly indicated.

In a fifth aspect, alone or in combination with one or more of the first through fourth aspects, the first evaluation for each beam includes at least one of: an average, a sum, or a max of the amplitude of the linear combination coefficients across the taps; and the second evaluation for each tap includes at least one of: an average, a sum, or a max of the amplitude of the linear combination coefficients across the beams.

In a sixth aspect, alone or in combination with one or more of the first through fifth aspects, determining the amplitude of each of the reported linear combination coefficients is based on a differential value and at least one of: the first evaluation or the second evaluation; and the UE reports the differential amplitude of a first set of the linear combination coefficients via a quantization of a first resolution and reports the differential amplitude of a second set of the coefficients via a quantization of a second resolution lower than the first resolution.

In a seventh aspect, alone or in combination with one or more of the first through sixth aspects, the UE reports a phase of the first set of the linear combination coefficients via the quantization of the first resolution; and reports a phase of the second set of the linear combination coefficients via the quantization of the second resolution.

In an eighth aspect, alone or in combination with one or more of the first through seventh aspects, the number of the first set of linear combination coefficients is configured by a base station (BS) via higher layer signaling or determined by the UE and signaled to the BS.

In a ninth aspect, alone or in combination with one or more of the first through eighth aspects, the UE determines, for a linear combination coefficient associated with a beam and a tap, a third evaluation of its amplitude based at least in part on the first evaluation associated with the beam, and the second evaluation associated with the tap. The number of the first set of linear combination coefficients is determined based on third evaluations.

In a tenth aspect, a method for wireless communication by a base station (BS), includes sending a channel state information (CSI) report configuration, configuring a user equipment (UE) for reporting at least a subset of precoding matrix information including, a plurality of selected beams, a frequency domain compression matrix for each of the beams at each of a plurality of taps in the time domain, and a subset of a plurality of linear combination coefficients associated with the frequency domain compression matrices and beams; and receiving a reported first evaluation from the UE. The first evaluation is, for each beam, an evaluation of the amplitude of the linear combination coefficients across the taps. The BS receives a reported second evaluation from the UE. The second evaluation is, for each tap, an evaluation of the amplitude of the linear combination coefficients across the beams. BS UE determines the subset of linear combination coefficients based at least in part on the reported first evaluation and the second evaluation.

In an eleventh aspect, in combination with the tenth aspect, the BS determines, for a linear combination coefficient associated with a beam and a tap, a third evaluation of its amplitude based at least in part on the first evaluation associated with the beam, and the second evaluation associated with the tap; orders the plurality of linear combination coefficients based on the corresponding third evaluations; and determines the subset of the plurality of coefficients based at least in part on the ordering.

In a twelfth aspect, alone or in combination with one or more of the tenth and eleventh aspects, at least two linear combination coefficients have an equal third evaluation, and the ordering includes ordering the at least two linear combination coefficients based on one of: the linear combination coefficient having a higher first evaluation; the linear combination coefficient having a higher second evaluation; or the linear combination coefficient having max of a first evaluation and a second evaluation higher than the max of a first evaluation and a second evaluation of the other linear combination coefficient.

In a thirteenth aspect, alone or in combination with one or more of the tenth through twelfth aspects, the first evaluation for each beam includes at least one of: an average, a sum, or a max of the amplitude of the linear combination coefficients across the taps; and the second evaluation for each tap includes at least one of: an average, a sum, or a max of the amplitude of the linear combination coefficients across the beams.

In a fourteenth aspect, alone or in combination with one or more of the tenth through thirteenth aspects, the BS receives a differential amplitude of a first set of the linear combination coefficients reported via a quantization of a first resolution; and receives a differential amplitude of a second set of the linear combination coefficients reported via a quantization of a second resolution lower than the first resolution.

In a fifteenth aspect, alone or in combination with one or more of the tenth through fourteenth aspects, the BS receives a phase of the first set of the linear combination coefficients reported via the quantization of the first resolution; and receives a phase of the second set of the linear combination coefficients reported via the quantization of the second resolution.

In a sixteenth aspect, alone or in combination with one or more of the tenth through fifteenth aspects, the number of the first set of linear combination coefficients is configured by the BS via higher layer signaling or received from the UE.

In a seventeenth aspect, alone or in combination with one or more of the tenth through sixteenth aspects, the BS determines, for a linear combination coefficient associated with a beam and a tap, a third evaluation of its amplitude based at least in part on the first evaluation associated with the beam, and the second evaluation associated with the tap. The number of the first set of coefficients is determined based on third evaluations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
   receiving a channel state information (CSI) report configuration configuring the UE for reporting at least a subset of precoding matrix information including:
      a plurality of selected beams;
      a frequency domain compression matrix for each of the plurality of selected beams at each of a plurality of taps in a time domain; and
      a subset of a plurality of linear combination coefficients associated with the the plurality of selected beams and the frequency domain compression matrix for each of the plurality of selected beams;
   determining the subset of the plurality of linear combination coefficients based on a first evaluation and a second evaluation, wherein:
      the first evaluation is, for each of the plurality of selected beams, an evaluation of an amplitude of the plurality of linear combination coefficients across the plurality of taps; and
      the second evaluation is, for each of the plurality taps, an evaluation of the amplitude of the plurality of linear combination coefficients across the plurality of selected beams; and
   reporting the first evaluation and the second evaluation.

2. The method of claim 1, wherein:
   each of the plurality of linear combination coefficients is associated with a beam of the plurality of selected beams and a tap of the plurality of taps;
   the method further comprises:
      determining, for each linear combination coefficient of the plurality of linear combination coefficients a third evaluation based at least in part on the first evaluation for the beam associated with the linear combination coefficient and the second evaluation for the tap associated with the linear combination coefficient; and
      ordering the plurality of linear combination coefficients based on the determined third evaluation for each of the plurality of linear combination coefficients; and
   determining the subset of the plurality of linear combination coefficients is based on the ordering of the plurality of linear combination coefficients.

3. The method of claim 2, wherein:
   at least two linear combination coefficients of the plurality of linear combination coefficients have an equal third evaluation; and
   the ordering the plurality of linear combination coefficients comprises ordering the at least two linear combination coefficients based on one of: the linear combination coefficient having a highest first evaluation among the at least two linear combination coefficients; the linear combination coefficient having a highest second evaluation among the at least two linear combination coefficients; or the linear combination coefficient having a highest maximum of the first evaluation and the second evaluation among the at least two linear combination coefficients.

4. The method of claim 1, further comprising jointly indicating a location and the amplitude for each of the subset of the plurality of linear combination coefficients.

5. The method of claim 1, wherein:
   the evaluation of the amplitude of the plurality of linear combination coefficients across the plurality of taps comprises an average amplitude, a summed amplitude, or a maximum amplitude of the plurality of linear combination coefficients across the plurality of taps; and
   the evaluation of the amplitude of the plurality of linear combination coefficients across the plurality of selected beams comprises an average amplitude, a summed amplitude, or a maximum amplitude of the plurality of linear combination coefficients across the plurality of selected beams.

6. The method of claim 1, wherein reporting the first evaluation and the second evaluation comprises:
   reporting a differential amplitude of a first set of the subset of the plurality of linear combination coefficients via a first quantization of a first resolution; and
   reporting a differential amplitude of a second set of the subset of the plurality of linear combination coefficients via a second quantization of a second resolution lower than the first resolution.

7. The method of claim 6, further comprising:
   reporting a phase of the first set of the subset of the plurality of linear combination coefficients via the first quantization of the first resolution; and reporting a phase of the second set of the subset of the plurality of linear combination coefficients via the second quantization of the second resolution.

8. The method of claim 6, wherein a number of the first set of the subset of the plurality of linear combination coefficients is configured by a base station (BS) via higher layer signaling or is determined by the UE and signaled to the BS.

9. The method of claim 6, wherein:
each of the plurality of linear combination coefficients is associated with a beam of the plurality of selected beams and a tap of the plurality of taps;
the method further comprise determining, for each linear combination coefficient of the plurality of linear combination coefficients a third evaluation based at least in part on the first evaluation for the beam associated with the linear combination coefficient and the second evaluation for the tap associated with the linear combination coefficient; and
a number of the first set of the subset of the plurality of linear combination coefficients is determined based on the determined third evaluations for the plurality of linear combination coefficients.

10. A method for wireless communication by a base station (BS), the method comprising:
sending a channel state information (CSI) report configuration configuring a user equipment (UE) for reporting at least a subset of precoding matrix information including:
a plurality of selected beams;
a frequency domain compression matrix for each of the plurality of selected beams at each of a plurality of taps in a time domain; and
a subset of a plurality of linear combination coefficients associated with the the plurality of selected beams and the frequency domain compression matrix for each of the plurality of selected beams;
receiving a reported first evaluation from the UE, wherein the first evaluation is, for each of the plurality of selected beams, an evaluation of an amplitude of the plurality of linear combination coefficients across the plurality of taps;
receiving a reported second evaluation from the UE, wherein the second evaluation is, for each of the plurality taps, an evaluation of the amplitude of the plurality of linear combination coefficients across the plurality of selected beams; and
determining the subset of the plurality of linear combination coefficients based at least in part on the reported first evaluation and the reported second evaluation.

11. The method of claim 10, wherein:
each of the plurality of linear combination coefficients is associated with a beam of the plurality of selected beams and a tap of the plurality of taps;
the method further comprises:
determining, for each linear combination coefficient of the plurality of linear combination coefficients a third evaluation based at least in part on the first evaluation for the beam associated with the linear combination coefficient and the second evaluation for the tap the linear combination coefficient; and
ordering the plurality of linear combination coefficients based on the determined third evaluation for each of the plurality of linear combination coefficients; and determining the subset of the plurality of linear combination coefficients is based at least in part on the ordering of the plurality of linear combination coefficients.

12. The method of claim 11, wherein:
at least two linear combination coefficients of the plurality of linear combination coefficients have an equal third evaluation; and
ordering the plurality of linear combination coefficients comprises ordering the at least two linear combination coefficients based on one of: the linear combination coefficient having a highest first evaluation among the at least two linear combination coefficients; the linear combination coefficient having a highest second evaluation among the at least two linear combination coefficients; or the linear combination coefficient having a highest maximum of the first evaluation and the second evaluation among the at least two linear combination coefficients.

13. The method of claim 10, wherein:
the evaluation of the amplitude of the plurality of linear combination coefficients across the plurality of taps comprises an average amplitude, a summed amplitude, or a maximum amplitude of the plurality of linear combination coefficients across the plurality of taps; and
the evaluation of the amplitude of the plurality of linear combination coefficients across the plurality of selected beams comprises an average amplitude, a summed amplitude, or a maximum amplitude of the plurality of linear combination coefficients across the plurality of selected beams.

14. The method of claim 10, wherein receiving the reporting first evaluation and receiving the reported second evaluation comprises:
receiving a differential amplitude of a first set of the subset of the plurality of linear combination coefficients via a first quantization of a first resolution; and
receiving a differential amplitude of a second set of the subset of the plurality of linear combination coefficients via a second quantization of a second resolution lower than the first resolution.

15. The method of claim 14, further comprising:
receiving a phase of the first set of the subset of the plurality of linear combination coefficients reported via the first quantization of the first resolution; and
receiving a phase of the second set of the subset of the plurality of linear combination coefficients reported via the second quantization of the second resolution.

16. The method of claim 14, wherein a number of the first set of the subset of the plurality of linear combination coefficients is configured by the BS via higher layer signaling or is received from the UE.

17. The method of claim 14, wherein:
each of the plurality of linear combination coefficients is associated with a beam of the plurality of selected beams and a tap of the plurality of taps;
the method further comprise determining, for each linear combination coefficient of the plurality of linear combination coefficients a third evaluation based at least in part on the first evaluation for the beam associated with the linear combination coefficient and the second evaluation for the tap the linear combination coefficient; and
a number of the first set of the subset of the plurality of linear combination coefficients is determined based on the determined third evaluations for the plurality of linear combination coefficients.

18. An apparatus for wireless communication, the apparatus comprising:
a receiver configured to receive a channel state information (CSI) report configuration configuring the apparatus for reporting at least a subset of precoding matrix information including:
a plurality of selected beams;
a frequency domain compression matrix for each of the plurality of selected beams at each of a plurality of taps in a time domain; and
a subset of a plurality of linear combination coefficients associated with the the plurality of selected beams and the frequency domain compression matrix for each of the plurality of selected beams;
memory storing computer executable code thereon;
one or more processors coupled with the memory and configured to, individually or collectively, execute the computer executable code and cause the apparatus to determine the subset of the plurality of linear combination coefficients based on a first evaluation and a second evaluation, wherein:
the first evaluation is, for each of the plurality of selected beams, an evaluation of an amplitude of the plurality of linear combination coefficients across the plurality of taps; and
the second evaluation is, for each of the plurality taps, an evaluation of the amplitude of the plurality of linear combination coefficients across the plurality of selected beams; and
a transmitter configured to report the first evaluation and the second evaluation.

19. The apparatus of claim 18, wherein:
each of the plurality of linear combination coefficients is associated with a beam of the plurality of selected beams and a tap of the plurality of taps;
the one or more processors are further configured to cause the apparatus to:
determine, for each linear combination coefficient of the plurality of linear combination coefficients a third evaluation based at least in part on the first evaluation for the beam associated with the linear combination coefficient and the second evaluation for the tap the linear combination coefficient; and
order the plurality of linear combination coefficients based on the determined third evaluation for each of the plurality of linear combination coefficients; and
the one or more processors are configured to cause the apparatus to determine the subset of the plurality of linear combination coefficients based on the order of the plurality of linear combination coefficients.

20. The apparatus of claim 19, wherein:
at least two linear combination coefficients of the plurality of linear combination coefficients have an equal third evaluation; and
the one or more processors being configured to cause the apparatus to order the plurality of linear combination coefficients comprises the one or more processors being configured to cause the apparatus to order the at least two linear combination coefficients based on one of: the linear combination coefficient having a highest first evaluation among the at least two linear combination coefficients; the linear combination coefficient having a highest second evaluation among the at least two linear combination coefficients; or the linear combination coefficient having a highest maximum of the first evaluation and the second evaluation among the at least two linear combination coefficients.

21. The apparatus of claim 18, wherein the one or more processors are configured to cause the apparatus to jointly indicate a location and the amplitude for each of the subset of the plurality of linear combination coefficients.

22. The apparatus of claim 18, wherein:
the evaluation of the amplitude of the plurality of linear combination coefficients across the plurality of taps comprises an average amplitude, a summed amplitude, or a maximum amplitude of the plurality of linear combination coefficients across the plurality of taps; and
the evaluation of the amplitude of the plurality of linear combination coefficients across the plurality of selected beams comprises an average amplitude, a summed amplitude, or a maximum amplitude of the plurality of linear combination coefficients across the plurality of selected beams.

23. The apparatus of claim 18, wherein the transmitter being configured to report the first evaluation and the second evaluation comprises the transmitter being configured to:
report a differential amplitude of a first set of the subset of the plurality of linear combination coefficients via a first quantization of a first resolution; and
report a differential amplitude of a second set of the subset of the plurality of linear combination coefficients via a second quantization of a second resolution lower than the first resolution.

24. The apparatus of claim 23, where the one or more processors are further configured to cause the apparatus to:
report a phase of the first set of the subset of the plurality of linear combination coefficients via the first quantization of the first resolution; and
report a phase of the second set of the subset of the plurality of linear combination coefficients via the second quantization of the second resolution.

25. The apparatus of claim 23, wherein:
each of the plurality of linear combination coefficients is associated with a beam of the plurality of selected beams and a tap of the plurality of taps;
the one or more processors are further configured to cause the apparatus to determine, for each linear combination coefficient of the plurality of linear combination coefficients a third evaluation based at least in part on the first evaluation for the beam the linear combination coefficient and the second evaluation for the tap the linear combination coefficient; and
a number of the first set of the subset of the plurality of linear combination coefficients is determined based on the determined third evaluations for the plurality of linear combination coefficients.

26. An apparatus for wireless communication, the apparatus comprising:
a transmitter configured to send a channel state information (CSI) report configuration configuring a user equipment (UE) for reporting at least a subset of precoding matrix information including:
a plurality of selected beams;
a frequency domain compression matrix for each of the plurality of selected beams at each of a plurality of taps in a time domain; and
a subset of a plurality of linear combination coefficients associated with the the plurality of selected beams and the frequency domain compression matrix for each of the plurality of selected beams;
a receiver configured to:
receive a reported first evaluation from the UE, wherein the first evaluation is, for each of the plurality of selected beams, an evaluation of an amplitude of the plurality of linear combination coefficients across the plurality of taps; and receive a reported second evaluation from the UE, wherein the second evaluation is, for each of the plurality taps, an evaluation of the amplitude of the plurality of linear combination coefficients across the plurality of selected beams;

memory storing computer executable code; and one or more processors coupled with the memory and configured to execute the computer executable code and, individually or collectively, cause the apparatus to determine the subset of the plurality of linear combination coefficients based at least in part on the reported first evaluation and the reported second evaluation.

27. The apparatus of claim 26, wherein:

each of the plurality of linear combination coefficients is associated with a beam of the plurality of selected beams and a tap of the plurality of taps;

the one or more processors are further configured to cause the apparatus to:
  determine, for each linear combination coefficient of the plurality of linear combination coefficients a third evaluation based at least in part on the first evaluation for the beam associated with the linear combination coefficient and the second evaluation for the tap the linear combination coefficient; and
  order the plurality of linear combination coefficients based on the determined third evaluation for each of the plurality of linear combination coefficients; and the one or more processors are configured to cause the apparatus to determine the subset of the plurality of linear combination coefficients based at least in part on the order of the plurality of linear combination coefficients.

28. The apparatus of claim 27, wherein:

at least two linear combination coefficients of the plurality of linear combination coefficients have an equal third evaluation; and the one or more processors being configured to cause the apparatus to order the plurality of linear combination coefficients comprises the one or more processors being configured to cause the apparatus to order the at least two linear combination coefficients based on one of: the linear combination coefficient having a highest first evaluation among the at least two linear combination coefficients; the linear combination coefficient having a highest second evaluation among the at least two linear combination coefficients; or the linear combination coefficient having a highest maximum of the first evaluation and the second evaluation among the at least two linear combination coefficients.

29. The apparatus of claim 26, wherein:

the evaluation of the amplitude of the plurality of linear combination coefficients across the plurality of taps comprises an average amplitude, a summed amplitude, or a maximum amplitude of the plurality of linear combination coefficients across the plurality of taps; and the evaluation of the amplitude of the plurality of linear combination coefficients across the plurality of selected beams comprises an average amplitude, a summed amplitude, or a maximum amplitude of the plurality of linear combination coefficients across the plurality of selected beams.

30. The apparatus of claim 26, wherein the receiver being configured to receive the reporting first evaluation and receiving the reported second evaluation comprises the receiver being configured to:
  receive a differential amplitude of a first set of the subset of the plurality of linear combination coefficients via a first quantization of a first resolution; and
  receive a differential amplitude of a second set of the subset of the plurality of linear combination coefficients via a second quantization of a second resolution lower than the first resolution.

* * * * *